United States Patent [19]
Dixon et al.

[11] Patent Number: 5,499,265
[45] Date of Patent: Mar. 12, 1996

[54] SPREAD SPECTRUM CORRELATOR

[75] Inventors: Robert C. Dixon, Palmer Lake; Jeffrey S. Vanderpool, Colorado Springs, both of Colo.

[73] Assignee: Omnipoint Data Company, Incorporated, Boston, Mass.

[21] Appl. No.: 216,084

[22] Filed: Mar. 21, 1994

Related U.S. Application Data

[63] Continuation of Ser. No. 949,331, Sep. 21, 1992, which is a continuation of Ser. No. 698,458, May 10, 1991, abandoned, which is a continuation of Ser. No. 390,315, Aug. 7, 1989, Pat. No. 5,022,047.

[51] Int. Cl.$^6$ ........................................ H04K 1/00
[52] U.S. Cl. ............................... 375/200; 380/34
[58] Field of Search ............................ 375/1, 48, 66, 375/89; 455/59, 103, 209, 216; 364/726; 380/34

[56] References Cited

U.S. PATENT DOCUMENTS

| | | |
|---|---|---|
| 27,738 | 8/1893 | Takamichi Honma et al. |
| 3,934,203 | 1/1976 | Schiff ............................. 325/6 |
| 3,978,436 | 8/1976 | Alig et al. |
| 4,021,898 | 5/1977 | Willis et al. |
| 4,051,448 | 9/1977 | Coussot . |
| 4,100,498 | 7/1978 | Alsup et al. ......................... 328/14 |
| 4,131,484 | 12/1978 | Caruso et al. |
| 4,163,944 | 8/1979 | Chambers et al. |
| 4,164,628 | 8/1979 | Ward et al. ......................... 179/15 BA |
| 4,217,563 | 8/1980 | Vale ............................... 333/150 |
| 4,222,115 | 9/1980 | Cooper et al. ......................... 375/1 |
| 4,247,942 | 1/1981 | Hauer ............................... 375/25 |
| 4,301,530 | 11/1981 | Gutleber ............................. 370/18 |
| 4,314,393 | 2/1982 | Wakatsuki et al. |
| 4,355,411 | 10/1982 | Reudink et al. ........................ 455/33 |
| 4,418,393 | 11/1983 | Zscheile, Jr. ......................... 375/1 X |
| 4,418,425 | 11/1983 | Fennel, Jr. et al. .................... 455/27 |
| 4,432,089 | 2/1984 | Wurzburg et al. |
| 4,445,256 | 5/1984 | Huguenin et al. ...................... 29/25.35 |
| 4,455,651 | 6/1984 | Baran ............................... 370/104 |
| 4,456,793 | 6/1984 | Baker et al. |
| 4,481,640 | 11/1984 | Chow et al. ........................... 375/1 |
| 4,484,028 | 11/1984 | Kelley et al. |
| 4,506,372 | 3/1985 | Massey ............................... 375/116 |
| 4,517,679 | 5/1985 | Clark et al. ........................... 375/37 |

(List continued on next page.)

FOREIGN PATENT DOCUMENTS

| | | | |
|---|---|---|---|
| 2208462 | 3/1989 | Japan | ........................... H04B 1/62 |
| 2211053 | 6/1989 | Japan | ........................... H04L 9/00 |
| 8700370 | 1/1987 | WIPO | ........................... 375/1 |

OTHER PUBLICATIONS

NEC Research & Development (1990) Apr., No. 97, Tokyo, JP, A High Performance Power Line Spread–Spectrum Modem, Soichi Tsumura, pp. 57–65.

IEEE Transactions on Broadcasting 36 (1990) Sep., No. 3, New York, US, A Spread–Spectrum Based Synchronization Technique For Digital Broadcast Systems, pp. 185–194.

Dixon, Robert C., *Spread Spectrum Systems*, (J. Wiley & Sons, 2d Ed. 1984).

(List continued on next page.)

*Primary Examiner*—David C. Cain
*Attorney, Agent, or Firm*—Lyon & Lyon

[57] ABSTRACT

An apparatus for decoding a received spread spectrum signal having a data signal modulated with a pseudo-noise code and transmitted as an RF spread spectrum signal. A first reference register holds a first pseudo-noise signal, a second reference register holds a second pseudo-noise signal, and a receive-register holds a received spread spectrum signal. A first modulo adder adds each chip of the received spread spectrum signal with each respective chip of the first pseudo-noise signal, thereby generating a first plurality of chip-comparison signals. A first summer adds the first plurality of chip-comparison signals, generating a first correlation signal. The comparator compares the correlation signal to an upper-threshold level and a lower-threshold level, and respectively generates a first data-symbol signal or a second data-symbol signal.

20 Claims, 4 Drawing Sheets

U.S. PATENT DOCUMENTS

| | | | |
|---|---|---|---|
| 4,525,835 | 1/1985 | Vance et al. | 370/29 |
| 4,550,414 | 10/1985 | Guinon et al. | 375/1 |
| 4,561,089 | 12/1985 | Rouse et al. | |
| 4,562,370 | 12/1985 | Von Dach | |
| 4,563,774 | 1/1986 | Gloge | 455/607 |
| 4,567,588 | 1/1986 | Jerrim | |
| 4,569,062 | 2/1986 | Dellande et al. | |
| 4,587,662 | 5/1986 | Langewellpott | 375/1 |
| 4,601,047 | 7/1986 | Horwitz et al. | |
| 4,606,039 | 8/1986 | Nicolas et al. | |
| 4,612,637 | 9/1986 | Davis et al. | 370/95 |
| 4,621,365 | 11/1986 | Chiu | 375/1 |
| 4,622,854 | 11/1986 | Locke et al. | |
| 4,630,283 | 12/1986 | Schiff | 375/1 |
| 4,641,317 | 2/1987 | Fullerton | 375/1 |
| 4,642,505 | 2/1987 | Arvanitis | 310/312 |
| 4,647,863 | 3/1987 | Skudera et al. | 329/112 |
| 4,649,549 | 3/1987 | Halpern et al. | 380/32 |
| 4,653,069 | 3/1987 | Roeder | 380/31 |
| 4,660,164 | 4/1987 | Leibowitz | 364/728 |
| 4,672,254 | 6/1987 | Dolat et al. | |
| 4,672,658 | 6/1987 | Kavehrad et al. | 379/63 |
| 4,680,785 | 7/1987 | Akiyama et al. | |
| 4,691,326 | 9/1987 | Tsuchiya | 375/1 |
| 4,701,904 | 10/1987 | Darcie | |
| 4,703,474 | 10/1987 | Foschini et al. | |
| 4,707,839 | 11/1987 | Andren et al. | 375/1 |
| 4,718,080 | 1/1988 | Serrano | |
| 4,724,435 | 2/1988 | Moses et al. | |
| 4,742,512 | 5/1988 | Akashi et al. | 370/96 |
| 4,745,378 | 5/1988 | Niitsuma et al. | 333/196 |
| 4,754,453 | 6/1988 | Eizenhofer | 370/95 |
| 4,754,473 | 6/1988 | Edwards | |
| 4,759,034 | 7/1988 | Nagazumi | 375/1 |
| 4,759,078 | 7/1988 | Schiller | |
| 4,769,812 | 9/1988 | Shimizu | |
| 4,787,093 | 11/1988 | Rorden | 375/23 |
| 4,800,885 | 1/1989 | Johnson | 128/633 |
| 4,804,938 | 2/1989 | Rouse et al. | |
| 4,805,208 | 2/1989 | Schwartz | |
| 4,807,222 | 2/1989 | Amitay | |
| 4,813,057 | 3/1989 | Fullerton | 375/37 |
| 4,815,106 | 3/1989 | Propp et al. | 375/36 |
| 4,833,702 | 5/1989 | Shitara et al. | |
| 4,837,786 | 6/1989 | Gurantz et al. | 370/20 |
| 4,837,802 | 6/1989 | Higashiyama et al. | |
| 4,860,307 | 8/1989 | Nakayama | 375/1 |
| 4,866,732 | 9/1989 | Carey et al. | 375/1 |
| 4,878,238 | 10/1989 | Rash et al. | 375/1 |
| 4,893,327 | 1/1990 | Stern et al. | 379/59 |
| 4,894,842 | 1/1990 | Broekhaven et al. | |
| 4,901,307 | 2/1990 | Gilhousen et al. | 370/18 |
| 4,905,221 | 2/1990 | Ichiyoshi | 375/1 |
| 4,918,689 | 4/1990 | Hui | 370/85 |
| 4,943,973 | 7/1990 | Werner | 375/1 |
| 4,965,759 | 10/1990 | Uchida et al. | 375/1 X |
| 4,979,186 | 12/1990 | Fullerton | 375/23 |
| 4,984,247 | 1/1991 | Kaufmann et al. | 375/1 |
| 4,995,083 | 2/1991 | Baker et al. | 380/23 |
| 5,005,183 | 4/1991 | Carey et al. | 375/1 |
| 5,008,953 | 4/1991 | Dahlin et al. | 455/33 |
| 5,016,255 | 5/1991 | Dixon et al. | 375/1 |
| 5,018,165 | 5/1991 | Sohner et al. | 375/1 |
| 5,022,047 | 6/1991 | Dixon et al. | 375/1 |
| 5,023,887 | 6/1991 | Takeuchi et al. | 375/1 |
| 5,025,452 | 6/1991 | Sohner et al. | 375/1 |
| 5,042,050 | 8/1991 | Owen | 375/1 |
| 5,056,109 | 10/1991 | Gilhousen et al. | 375/1 |
| 5,073,900 | 12/1991 | Mallinckrodt | 375/1 |
| 5,081,642 | 6/1992 | O'Clock, Jr. et al. | 375/1 |
| 5,101,501 | 3/1992 | Gilhousen et al. | 375/1 |
| 5,109,390 | 4/1992 | Gilhousen et al. | 375/1 |
| 5,146,471 | 9/1992 | Cowart | 375/1 |

OTHER PUBLICATIONS

Ralph Eschenbach, *Applications of Spread Spectrum Radio to Indoor Data Communications*, Proceedings of the IEEE, 1982, p. 34.5–1.

Mohsen Kavehrad et al., *Direct Sequence Spread Spectrum with DPSK Modulation and Diversity for Indoor Wireless Communications*, IEEE Transactions on Communications, Feb. 1987, vol. COM–35, No. 2, pp. 224–226.

Payne Freret et al., *Applications of Spread–Spectrum Radio to Wireless Terminal Communications*, Proceedings of the IEEE, 1980, pp. 69.7.1–69.7.4.

Payne Freret, *Wireless Terminal Communications Using Spread–Spectrum Radio*, Proceedings of the IEEE, 1980, pp. 244–248.

S. Nanayakkara, *High Speed Receiver Designs Based on Surface Acoustic Wave Devices*, Sixth International Conference On Digital Statellite Communications, Sep. 1983, pp. 16–22.

J. H. Collins & P. M. Grant, *The Role of Surface Acoustic Wave Technology in Communication Systems*, Ultrasonics, Mar. 1972, vol. 10, No. 2, pp. 59–71.

P. J. Hagon et al., *A Programmable Surface Acoustic Wave Matched Filter for Phase–Coded Spread Spectrum Waveforms*, IEEE Transactions on Microwave Theory and Techniques, Apr. 1973, vol. 21, No. 4, pp. 303–306.

A. Baier and P. W. Baier, *Digital Matched Filtering of Arbitrary Spread–Spectrum Waveforms Using Correlators with Binary Quantization*, 2 Proceedings, 1983, IEEE Military Communications Conference, Oct. 1983, pp. 418–423.

A. Baier, *A Low–Cost Digital Matched Filter for Arbitrary Constant–Envelope Spread Spectrum Waveforms*, IEEE Transactions on Communications, Apr. 1984, vol. Com.–32, No. 4, pp. 354–361.

Roger D. Colvin, *Correlators And Convolvers Used In Spread Spectrum Systems*, National Telecommunications Conference, Conference Record vol. 1 of 4, 1982, pp. 22.4.1–22.4.5.

M. K. Sust and M. Kowatsch, *All Digital Signal Processing In A Spread Spectrum Communication System*, Proceedings of MELECON '87, Mar. 24–26, 1987 pp. 157–161.

Christopher R. Vale, *SAW Quadraphase Code Generator*, IEEE Transactions On Microwave Theory and Techniquest, vol. MTT–29, No. 5, May 1981, pp. 410–414.

John W. Taylor, Jr., Herman J. Blinchikoff, *Quadriphase Code–A Radar Pulse Compression Signal With Unique Characteristics*, IEEE Transactions on Aerospace and Electronic Systems, vol. 24, No. 2, Mar. 1988, pp. 156–170.

Rodger E. Ziemer, Carl R. Ryan and James H. Stilwell, *Conversion and Matched Filter Approximations for Serial Minimum–Shift Keyed Modulation*, IEEE Transactions on Communications, vol. Com. 30, No. 3, Mar. 1982, pp. 495–509.

Manfred G. Unkauf, *Surface Wave Devices in Spread Spectrum Systems*, Surface Wave Filters (Wiley 1977), pp. 477–509.

Kavehrad, M. and McLane, P. J., *Spread Spectrum for Indoor Digital Radio*, IEEE Communications Magazine, Jun. 1987, vol. 25, No. 5, pp. 32–40.

Robert C. Dixon, *Spread Spectrum Systems*, John Wiley & Sons, 1984; pp. 84–86, 206.

Robert C. Dixon, *Spread Spectrum System*, pp. 230–232.

Mohsen Kavehrad, *Direct Sequence Spread Spectrum with DPSK Modulation and Diversity for Indoor Wireless Communications*, IEEE Transactions on Communications, vol. COM–35, No. 2, Feb. 1987.

Payne Freret et al., *Applications of Spread–Spectrum Radio to Wireless Terminal Communications*, Hewlett–Packard Laboratories, IEE 1980, pp. 69.7.1–69.7.4.

Payne Freret et al., *Wireless Terminal Communications Using Spread–Spectrum Radio*, Hewlett–Packard Laboratories, IEEE 1980, pp. 244–247.

M. Kavehrad and P. J. McLane, *Performance of Low–Complexity Channel Coding and Diversity for Spread Spectrum in Indoor, Wireless Communication*, AT&T Technical Journal, vol. 64, No. 8, Oct. 1985, U.S.A.

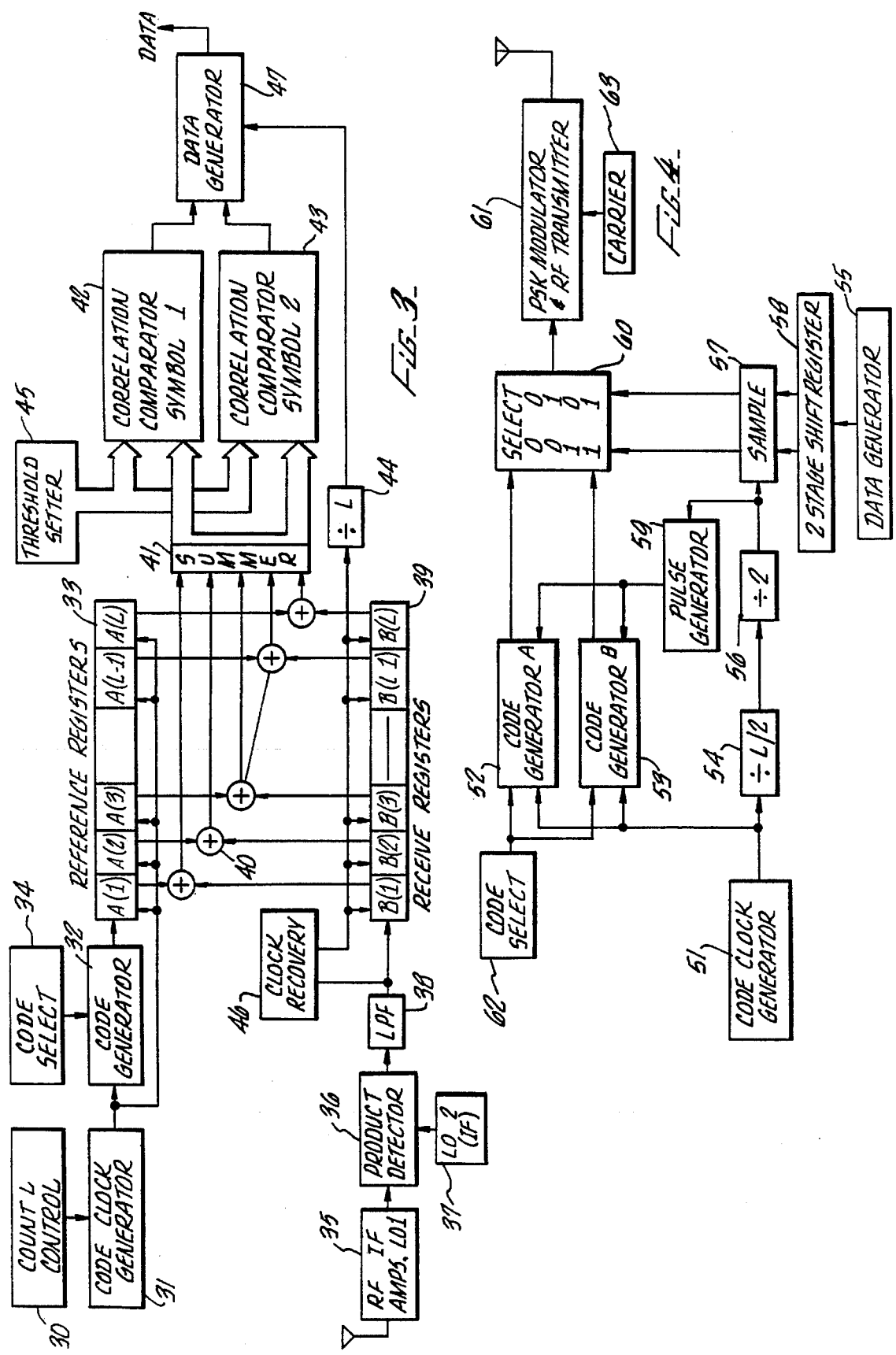

SPREAD SPECTRUM CORRELATOR

This is a continuation of Ser. No. 07/949,331 filed on Sep. 21, 1992 which is a continuation of application Ser. No. 07/698,458, filed on May 10, 1991 now abandoned which is a Continuation of Ser. No. 07/390,315, filed Aug. 7, 1989 now U.S. Pat. No. 5,022,047, hereby incorporated by reference as if fully set forth herein.

BACKGROUND OF THE INVENTION

This invention relates to spread spectrum communications, and more particularly to a non-code synchronous spread spectrum communications system.

DESCRIPTION OF THE PRIOR ART

A spread spectrum system is one in which the signal is spread over a band much wider than the maximum bandwidth required to transmit the information being sent. Techniques for direct sequence spread spectrum modulation have been developed for several years to ensure secure communications. Modulation is achieved by mixing the information to be sent with a periodic pseudo-noise (PN) code. The result is a sin(X)/X signal with a very wide bandwidth, as compared to the information, and low spectral density. This spectral density reduces the signal's sensitivity to in-band interference and jamming, as well as reducing interference with other radio sensitive equipment. Among the other advantages inherent to a spread spectrum system are selective addressing capabilities, code division multiplexing for multiple access, and highly accurate ranging capabilities.

Due to the encoded nature of the signal, demodulation is a more involved process than with traditional communications systems, and involves a reference code, identical to that transmitted, synchronized to the received code. The difficulty with this process is that there is no indication of the degree of non-synchronization between received and reference codes until a very high degree of synchronization is achieved. Additionally, mismatches between transmit and receive oscillators used to generate PN codes tend to cause drift in the synchronization between transmitter and receiver.

A prior art communications system using two pseudo-random waveforms and two correlators for designating a MARK or a SPACE, is disclosed in U.S. Pat. No. 4,247,942, to Hauer, issued Jan. 27, 1981, which is incorporated herein by reference. Hauer discloses in a communication system, a first delay-line having multiple spaced taps for supplying successive input pulses to the delay line. In response to each input impulse, variously delayed pulses appear at the taps of the delay line, which are used to generate pulses representing a MARK or a SPACE. His disclosure includes synchronous detectors, and means for supplying the carrier-transmitted pulses to the detectors.

None of the prior art teaches or suggests an apparatus for acquiring a spread spectrum signal using one correlator, nor an apparatus having an acquisition time of a spread spectrum signal equal to the time duration of one data bit on every data bit. Further, none of the prior art teaches dual threshold detection in a single correlator such that a first data symbol and a second data symbol can be determined with equal accuracy in one correlator, nor the use of a plurality of such dual threshold detection correlators to achieve a doubling of the data rate for each additional dual threshold detection correlator without increasing the code rate or the signal acquisition time.

OBJECTS AND SUMMARY OF THE INVENTION

An object of the invention is to provide an apparatus for acquiring a spread spectrum signal using one correlator which is direct, inexpensive, and simple to use.

Another object of the invention is to provide an apparatus for acquiring a spread spectrum signal that has a dual threshold detection capability in one correlator for determining the occurrence of a first data symbol or a second data symbol.

A still further object of the invention is to provide an apparatus for detecting a spread spectrum signal without the use of a synchronous reference code.

An additional object of the invention is to provide an apparatus which will acquire a spread spectrum signal on each data bit received at the rate the data is transmitted with no time loss due to code synchronization and without use of any code synchronization preambles.

A further object of the invention is to provide the ability to use a plurality of dual threshold detection correlators (DTDCs).

Another object of the invention is to provide a plurality of DTDCs such that the transmitted and received data symbol rate can be increased without increasing the transmitted and received code bit rate, nor increasing the bandwidth of the frequency spectrum which is utilized.

An additional object of the present invention is that for the plurality of DTDCs, the transmitted and received data symbol rate can be increased by a factor of two while the required number of correlators in the receiver increases by an increment of one.

An additional object of the present invention is that for the plurality of DTDCs, the time for acquiring the spread spectrum signal remains constant even as the transmitted and received data symbol rate increases.

According to the present invention, as embodied and broadly described herein, an apparatus for decoding a received spread spectrum signal, which includes a data signal modulated with a PN code, is provided, comprising threshold setting means, first reference-sequence-storage means, receive-sequence-storage means, first correlating means, and comparison means. The first correlating means may include first chip-comparison means and first summer means. The present invention may additionally include second reference-sequence-storage means, and second correlating means. The second correlating means may include second chip-comparison means and second summer means.

The threshold setting means may set the threshold for a match equal to or less than the total number of chips per code being acquired. The threshold setting means may analyze the pattern and application of the data to be transmitted and/or received using the spread spectrum signal, the noise environment, and the amount of error correction used with the data signal. In response to this analysis, the threshold setting means generates a threshold level. The threshold setting means may be used to predetermine each threshold for a specific device, application, or operating environment, or it may be coupled to the spread spectrum receiver and used to set and adjust one or more threshold levels as the application or operating environment changes.

For the case of one correlator having a dual threshold capability, the first reference-sequence-storage means stores a first pseudo-noise signal, and the receive-sequence-storage means stores the received spread spectrum signal. The first chip-comparison means, which is coupled to the first reference-sequence-storage means and the receive-sequence-storage means, compares each chip of the received spread spectrum signal with each respective chip of the first pseudo-noise signal to generate a first plurality of chip-comparison signals. The first summer means, which is coupled to the first chip-comparison means, adds the first plurality of chip-comparison signals and thereby generates a first correlation signal. For a digital correlator implementation, in response to the first correlation signal being greater than the upper-threshold level, the comparison means generates a first data-symbol signal. In response to the first correlation signal being less than the lower-threshold level, the comparison means generates a second data-symbol signal.

For an analog correlator implementation, in response to the first correlation signal being greater than an analog-threshold level, the comparison means generates a first data-symbol-correlation signal. In response to the first inverse-correlation signal being greater than the analog-threshold level, the comparison means generates a second data-symbol-correlation signal.

For the case of two correlators, each having a dual threshold capability, the first reference-sequence-storage means stores a first pseudo-noise signal, the second reference-sequence-storage means stores a second pseudo-noise signal, and the receive-sequence-storage means stores the received spread spectrum signal. The first chip-comparison means is coupled to the first reference-sequence-storage means and the receive register means. In response to the received spread spectrum signal, the first chip-comparison means compares each chip of the received spread spectrum signal with each respective chip of the first pseudo-noise signal and thereby generates a first plurality of chip-comparison signals. The first summer means is coupled to the first chip-comparison means. In response to the first plurality of chip-comparison signals from the first chip-comparison means, the first summer means adds the first plurality of chip-comparison signals and thereby generates a first correlation signal.

The second chip-comparison means is coupled to the second reference-sequence-storage means and the receive-sequence-storage means. In response to the received spread spectrum signal, the second chip-comparison means compares each chip of the received spread spectrum signal with each respective chip of the second pseudo-noise signal and thereby generates a second plurality of chip-comparison signals. The second summer means is coupled to the second chip-comparison means. In response to the second plurality of chip-comparison signals, the second summer means adds the second plurality of chip-comparison signals and thereby generates a second correlation signal.

The comparison means is coupled to the first summer means and the second summer means. The comparison means for the digital correlator implementation includes upper- and lower-threshold levels for each reference-sequence-storage means. In response to the first correlation signal being greater than the upper-threshold level, the comparison means generates a first data-symbol signal. In response to the first correlation signal being less than the lower-threshold level, the comparison means generates a second data-symbol signal. In response to the second correlation signal being less than the lower-threshold level, the comparison means generates a third data-symbol signal. In response to the second correlation signal being greater than the upper-threshold level, the comparison means generates a fourth data-symbol signal.

The comparison means for the analog correlator implementation includes first and second threshold levels, which may be equivalent for each reference-sequence-storage means. In response to the first correlation signal being greater than the first threshold level, the comparison means generates a first data-symbol signal. In response to the first inverted correlation signal being greater than the second threshold level, the comparison means generates a second data-symbol signal. In response to the second inverse correlation signal being greater than the second threshold level, the comparison means generates a third data-symbol signal. In response to the second correlation signal being greater than the first threshold level, the comparison means generates a fourth data-symbol signal.

Statistically, the accuracy of detection depends, in part, upon the threshold level settings, which may be a function of several variables: The total number of matched chips to the total number of chips on a per data symbol basis, the error rate and the degree of forward error correction on the input signal, and whether the data stream to be processed is continuous, cyclically repetitive, patterned, episodic, pulsed or random.

The present invention may further include a plurality of reference-sequence-storage means for storing a plurality of pseudo-noise signals with means for correlating the received spread spectrum signal with the plurality of pseudo-noise signals. The correlating means would thereby generate a plurality of correlation signals, depending on the particular received spread spectrum signal. Likewise, the comparison means would be responsive to the plurality of correlation signals for generating one of a plurality of data-symbol signals in response to the correlation signals crossing a particular threshold level in one of the DTDC reference-sequence-storage means.

Additional objects and advantages of the invention will be set forth in the description which follows, and in part will be obvious from the description, or may be learned by practice of the invention.

BRIEF DESCRIPTION OF THE DRAWINGS

The accompanying drawings, which are incorporated in and constitute a part of this specification, illustrate a preferred embodiment of the invention, and together with the description serve to explain the principles of the invention.

FIG. 3 illustrates one embodiment of a receiver according to the present invention;

FIG. 4 is a block diagram of a second embodiment of a transmitter according to the present invention;

DETAILED DESCRIPTION OF THE PREFERRED EMBODIMENTS

Figure 1:
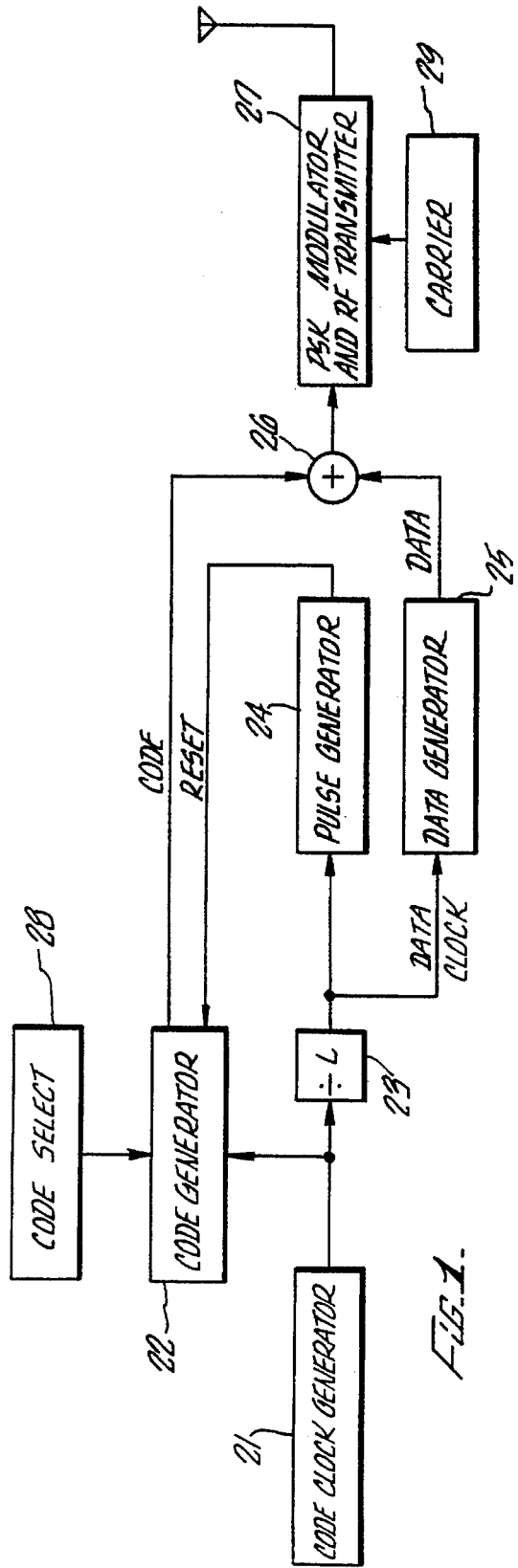
FIG. 1 is a block diagram for a particular embodiment of a transmitter according to the present invention.

Reference will now be made in detail to the present preferred embodiments of the invention, examples of which are illustrated in the accompanying drawings.

The present invention includes an apparatus for transmitting and decoding a received spread spectrum signal having a data signal modulated with a PN code to produce a spread spectrum signal. As illustratively shown in FIG. 1, a transmitter is shown including a code clock generator 21, code selector 28, code generator 22, code clock divider 23, pulse generator 24, data generator 25, modulo 2 adder 26, carrier 29, and phase shift keyed (PSK) modulator and RF transmitter 27. The code clock generator 21 generates a clock signal which is fed to the code generator 22 and to the clock divider 23. Using clock divider 23, the code and the data of the transmitter 27 are synchronized, with the code clock frequency being a multiple equal to the code length, L, of the data clock frequency thereby allowing one data bit per PN code sequence of length L. The data clock signal from code clock divider 23 is fed to the pulse generator 24 and to the data generator 25. The data generator 25 is the source of the data signal to be transmitted over the communications system. The output signal of the pulse generator 24 is fed to the code generator 22 which thereby generates a PN code chosen by code selector 28. The PN code, which is recursive, is then fed out of the code generator 22 and modulo 2 added with modulo 2 adder 26 to the data fed from the data generator 25. The output of the modulo adder 26 is the data signal modulated with the PN code, which is phase shift keyed modulated with a carrier 29 in PSK modulator and RF transmitter 27.

Figure 2:
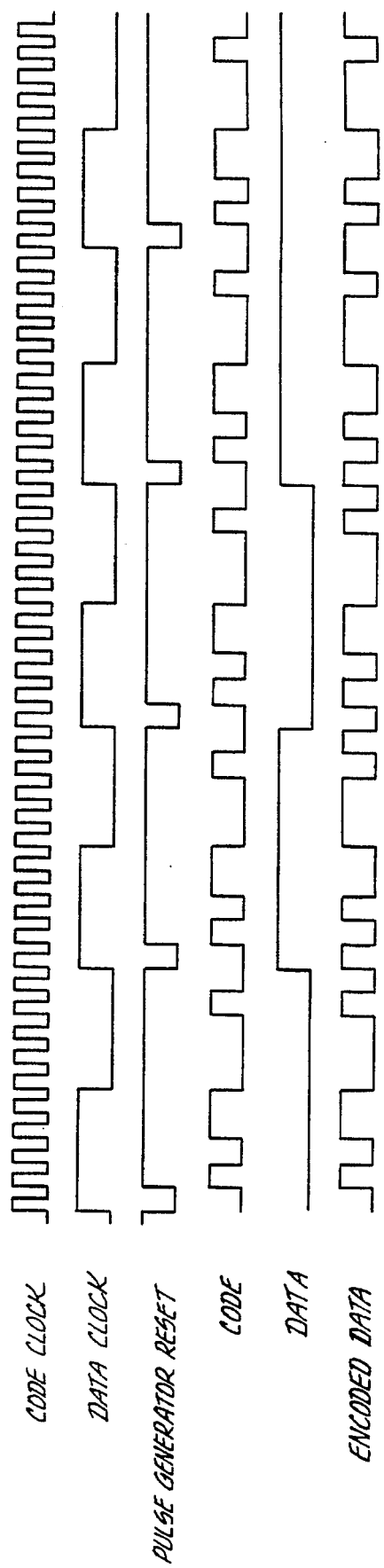
FIG. 2 is a timing diagram for a particular signal according to the present invention.

An example of the timing of the code and clock signals of FIG. 1 is shown in FIG. 2. The timing diagram illustrates a code clock signal, a data clock signal which is the code clock signal divided by the length of code, L, pulse generator reset signal, and the code signal, the data signal, and the encoded data signal. The code signal, when modulo 2 added with the data signal produces the encoded data signal and when modulated by an RF carrier produces a spread spectrum signal. The transmitted spread spectrum signal may be received by the receiver illustrated in FIG. 3.

While FIG. 3 illustrates a particular embodiment of one dual threshold detection correlator receiver of the present invention, the present invention in general includes an apparatus for decoding a received spread spectrum signal having a data signal modulated with a PN code. The apparatus comprises threshold means, first reference-sequence-storage means, receive-sequence-storage means, first correlating means, and comparison means. The first correlating means may include first chip-comparison means and first summer means. With reference to FIG. 3, the first reference-sequence-storage means may be embodied as reference registers 33, the receive-sequence-storage means may be embodied as receive registers 39, the first chip-comparison means may be embodied as first adders 40, the first summer means may be embodied as first summer 41, and the comparison means may be embodied as first and second symbol comparators 42, 43. The threshold setting means may be embodied as threshold setter device 45. The first adders 40 are coupled to the first reference registers 33 and the receive registers 39. First summer 41 is coupled to first adders 40.

In the exemplary arrangement shown in FIG. 3, a count control 30 may be coupled to a code clock generator 31 which is connected to a code generator 32 and reference registers 33. The code generator 32 is also connected to the reference registers 33. A code selection circuit 34 is coupled to code generator 32. The count control 30 controls the length of the particular pseudo-noise signal chosen by code selection circuit 34 to be detected by the receiver, and outputs signals to the code clock generator 31 which causes the code generator 32 to output a code of length L to first reference registers 33. Count control 30 triggers code clock generator 31 which thereby triggers code generator 32 and first reference registers 33. Code generator 32 outputs the particular pseudo-noise signal to first reference registers 33 as determined by a code selection circuit 34. The code selection circuit 34 can provide signals to the code generator 32 which enable it to scan through a plurality of pseudo noise codes. In operation, a single code can be loaded into the first reference registers 33 or, in a scanning mode, the first reference registers 33 can be periodically loaded with constantly varying codes until a match to a received code occurs.

Also shown in FIG. 3 is RF and IF amplifiers 35, coupled to a product detector 36 which is coupled to a local oscillator 37 and a low pass filter 38. The low pass filter 38 is coupled to receive registers 39 and clock recovery circuit 46.

For the case of one correlator having a dual threshold capability, the first reference registers 33 stores a first pseudo-noise signal, and the receive registers 39 stores the received spread spectrum signal. The first adders 40 compares each chip of the received spread spectrum signal with each respective chip of the first pseudo-noise signal to generate a first plurality of chip-comparison signals. The first summer 41 adds the first plurality of chip-comparison signals and thereby generates a first correlation signal. In response to the first correlation signal being greater than the upper-threshold level, the comparator 42 generates a first data-symbol signal. In response to the first correlation signal being less than the lower-threshold level, the comparator 42 generates a second data-symbol signal.

In operation a received spread spectrum signal having a data signal modulated with the PN code would be stored in receive registers 39 and the entire length, L, of a first pseudo-noise signal would be stored in first reference registers 33. Each chip of the received spread spectrum signal is modulo 2 added by each respective chip of the first reference pseudo-noise signal by first adders 40. This modulo addition of the two signals would thereby generate a first plurality of chip-comparison signals which would be transferred from first adders 40 to first summer 41. The first summer 41 adds the first plurality of signals to generate a first correlation signal.

The first symbol comparator 42 and second symbol comparator 43 are coupled to the first summer 41. The comparators 42, 43 have an upper-threshold level and a lower-threshold level. In response to the first correlation signal being greater than the upper-threshold level, the first symbol comparator 42 generates a first data-symbol-correlation signal. In response to the first correlation signal being less than the lower-threshold level, the second symbol-comparator 43 generates a second data-symbol-correlation signal. Data generator 47 thereby generates first or second data symbols, per the first or second data-symbol-correlation signal, respectively. The first and second data-symbol signals may be, respectively, 1-bit and 0-bit data signals.

Figure 5:
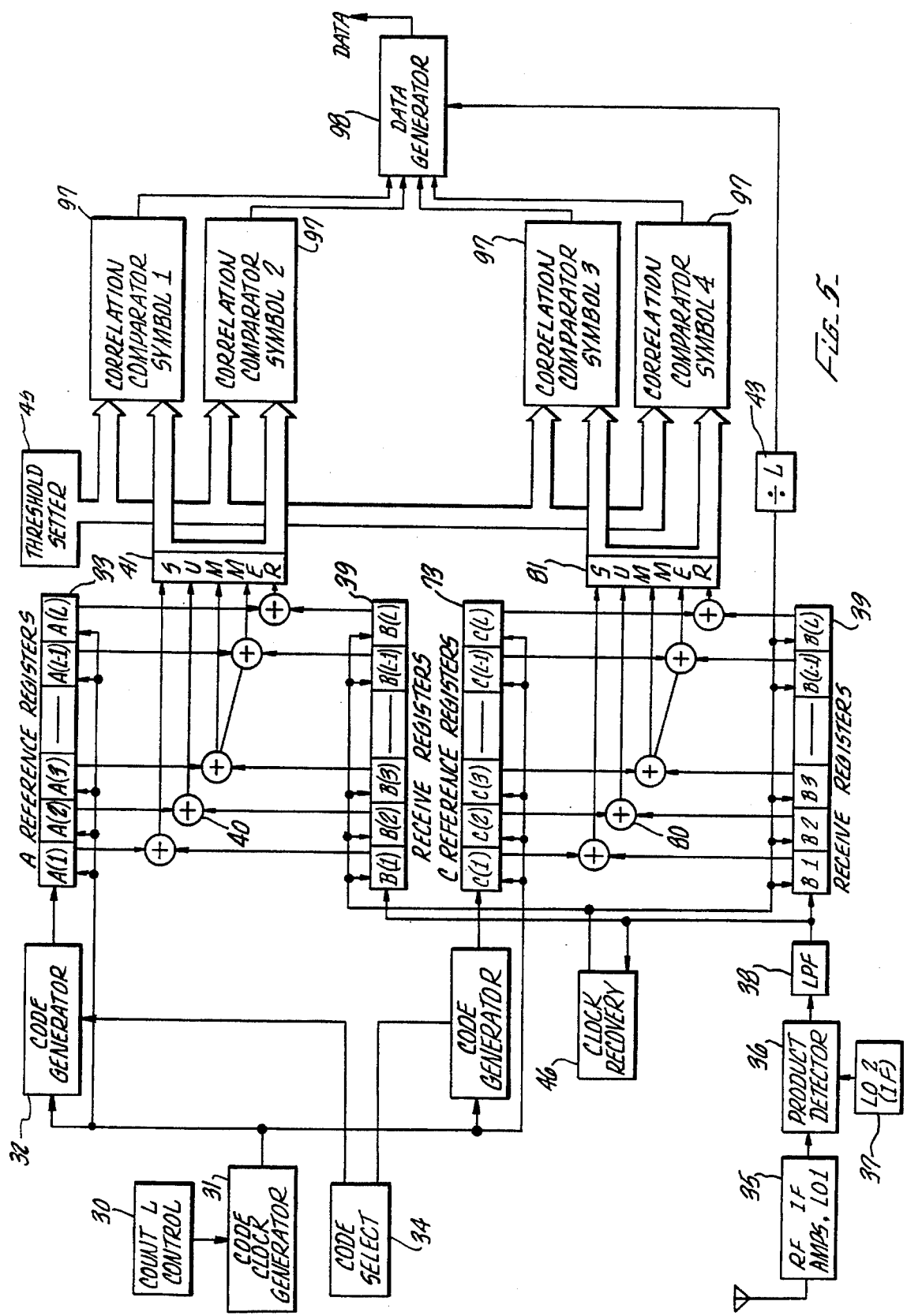
FIG. 5 is a block diagram of a second embodiment of a receiver according to the present invention.

The present invention can further include using two or more, up to N, different recursive sequences, with an example using two as illustrated in FIG. 4. In this particular case, a first code generator 52 and a second code generator 53 each generate a difference recursive sequence as chosen by code selector 62 for generating a spread spectrum code signal. Code clock generator 51 feeds code clock to code generator A 52 and code generator 53 as well as divider 54. Divide by L/2 feeds a clock signal, which has a period equal to twice that of a code sequence of length L, to divide 2 56, two stage shift registers 58, and data generator 55. Thus, two data bits per code length L are generated by data generator 55 and stored in parallel in two stage shift registers 58. Divider 56 feeds a clock signal per once code segment of length L to sampler 57 and pulse generator 59 which resets code generator A 52 and code generator 53. Sampler 57 outputs two signals to selector 60, which determine which of four code segments (code A, inverse code A, code B, inverse code B) which it receives from code generator A 52 and code generator B 53. The modulated code is then transferred from selector 60 to PSK modulator and RF transmitter 61 where it is PSK modulated with an RF carrier 63 in the transmitter. Transmitting a spread spectrum signal using the circuitry of FIG. 4 has an advantage in that as shown in FIG. 5, as a particular embodiment of the present invention, a receiver can be implemented using only two correlators for detecting four possible spread spectrum received codes. The particular codes are actually two spread spectrum PN codes, with 180° phase reversals.

Thus the present invention can further include second reference-sequence-storage means, second chip-comparison means, and second summer means. The second reference-sequence-storage means may be embodied as the second reference registers 73, the second chip-comparison means may be embodied as second adders 80, and the second summer may be embodied as second summer 81. The second reference-registers 73 stores a second pseudo-noise signal. The second adders 80 are coupled to the second reference-registers 73 and the receive registers 39.

For the case of two correlators as illustratively shown in FIG. 5, each having a dual threshold capability, the first adders 40 compares each chip of the received spread spectrum signal with each respective chip of the first pseudo-noise signal and thereby generates a first plurality of chip-comparison signals. The first summer 41 is coupled to the first adders 40. In response to the first plurality of chip-comparison signals from the first adders 40, the first summer 41 adds the first plurality of chip-comparison signals and thereby generates a first correlation signal.

The second adders 80 are coupled to the second reference registers 73 and the receive registers 39. In response to the received spread spectrum signal, the second adders 80 compares each chip of the received spread spectrum signal with each respective chip of the second pseudo-noise signal and thereby generates a second plurality of chip-comparison signals. The second summer 81 is coupled to the second adder 80. In response to the second plurality of chip-comparison signals, the second summer 81 adds the second plurality of chip-comparison signals and thereby generates a second correlation signal.

In this particular embodiment, the comparison means is embodied as comparison circuit 97. The comparison circuit 97 has upper- and lower-threshold levels. The comparison circuitry 97 is coupled to the first summer 41 and the second summer 81. In response to the first correlation signal from the first summer 41 being greater than its upper-threshold level the comparison circuitry 97 generates a first data-symbol-correlation signal. In response to the first correlation signal from summer 41 being less than its lower-threshold level, the comparison circuitry 97 generates a second data-symbol-correlation signal. In response to the second correlation signal from second summer 81 being greater than its upper-threshold level, comparison circuitry 97 generates a third data-symbol-correlation signal. In response to the second correlation signal from second summer 81 being less than its lower-threshold level, the comparison circuitry 97 generates a fourth data-symbol signal. Data generator 98 then generates the data symbol corresponding to the received data-symbol-correlation signal. The first, second, third, and fourth data-symbol signals may represent, for example, data bits 00, 01, 10, and 11.

While the present invention has disclosed using either a first correlator as shown in FIG. 3 or a first and second correlator as shown in FIG. 5, the present invention may be extended to using a plurality of correlators where the decoding decodes a plurality of data-symbol signals.

By using a plurality of DTDCs in the receiver, a code of length L can be used to transmit and receive a number of data symbols equal to twice the number of DTDCs in the receiver. Another advantage of using a plurality of DTDCs is that while the transmitted and received data symbol rate doubles with each additional DTDC, the code length, L, the aggregate code chip rate, and the bandwidth of the frequency spectrum used, all remain fixed. Moreover, the time to acquire the spread spectrum signal remains fixed, and the system remains inexpensive and simple. The code selection circuit can provide signals to the code generators which enable them to scan through a plurality of pseudo noise codes. In operation, single code sets can be loaded into the reference registers or, in a scanning mode, the reference registers can be periodically loaded with constantly varying codes until a match to a received code occurs.

In the system provided by this invention, a pseudo-noise signal may include a PN code segment having L bits produced with a clock rate equivalent to $L \times (R_d/S_d)$, where $R_d$ is the clock rate of the data to be modulated, and $S_d$ is the number of data bits per code segment of length L. For example, if the data rate to be transmitted for one data bit is 100 kHz, and the code length, L, is 100, then the code rate, $R_c$, is equivalent to $L \times (R_d/S_d) = (100) \times (100 \text{ kHz}/1) = 10$ MHz. For two data bits per code, the data rate rises to 200 kHz, but the code rate, $R_c = (100) \times (200 \text{ kHz}/2) = 10$ MHz. Thus, the data rate can increase without a like increase in the code rate. The number of data symbols produced per code segment of length L is $2^S d$ where $S_d =$ the number of data bits per code segment.

In the transmitter, the beginning of a code segment of length L is synchronously aligned with each data set, defined by the number of data bits per code segment, which may produce $2^S d$ data symbols. For example, if two data bits per code segment are to be transmitted, then the $2^S d = 4$ data symbols, which may be represented by 00, 01, 10, 11. If data symbol one is to be transmitted, then code one may be sent. If data symbol two is to be transmitted then the inverse of code one may be sent. The same process follows for data symbol three, which could use code two's inverse, and data symbol four, which could use the normal code two. In the receiver, reference code one and code two segments equivalent to those in the transmitter are loaded into the storage elements of the two correlators and held stationary. The received signal is then passed through the correlator, and when the correlator score from correlator one exceeds its threshold value T, a first data-symbol-correlation signal is produced. If the correlation score is less than its L-T, then a second data-symbol-correlation signal is produced. The same result follows for the third data symbol, when the second correlator score is less than its L-T, and the fourth data symbol when the second correlator score is greater than its T.

A second preferred embodiment of the present invention may use analog devices such as surface-acoustic-wave (SAW) devices or charge-coupled devices. The surface-acoustic-wave devices, as an example of analog devices, include reference-sequence-storage devices and receive-sequence-storage devices. The surface-acoustic-wave devices additionally may include the adders 40 and summers 41, and function as a complete self-contained correlator unit. Additionally, a plurality of sets of reference-sequence-storage devices may be constructed on one particular surface-acoustic-wave device along with the receive-sequence-storage devices to form a very compact means for decoding a plurality of pseudo-noise signals.

A delay line matched filter or SAW correlator is a passive device designed to recognize a specific sequence of code chips, as does a digital correlator, but accomplishes this through a correlation of phase shifts in an RF signal, rather than voltage levels at baseband, and can therefore avoid many of the problems inherent in a digital correlator, such as a high noise or interference/jamming environment.

Each delay element within the correlator has a delay equal to the period of the transmitted code clock such that each element corresponds to only one chip at any one time. As the received signal propagates down the delay line, the phase structure of each element is added in or out of phase with the propagated PN encoded wave, and the outputs of all the elements are then summed to arrive at a total correlation value. When all the phase shift structures of the elements match the phase shifts of the propagated wave, then the maximum sum and correlation is achieved.

Figure 6:
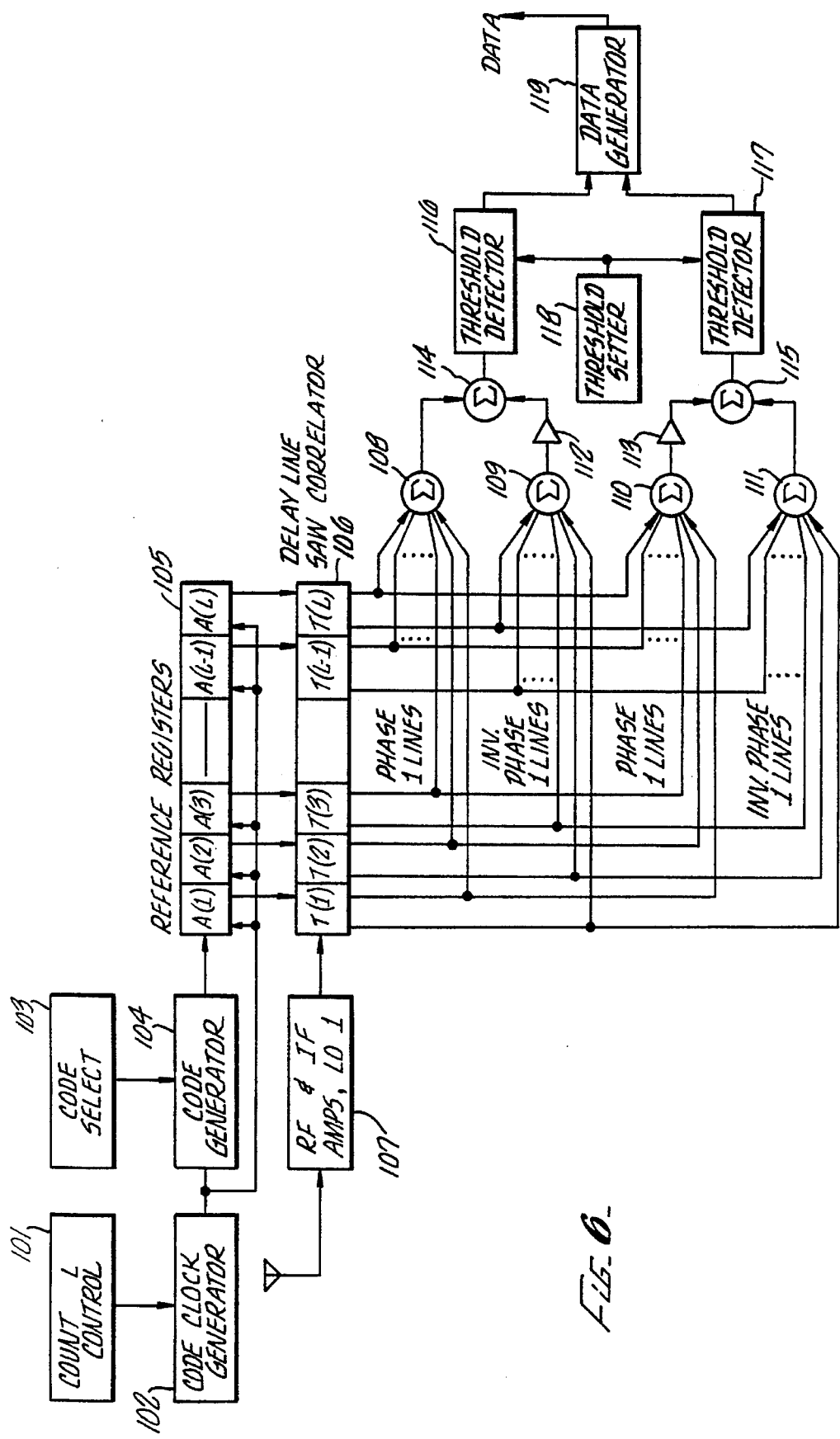
FIG. 6 illustrates an analog embodiment of the present invention as exemplified by a SAW correlator.

In order to achieve the desired correlation, the correct reference code must be "loaded" onto the SAW device. The present discussion is for a BPSK device, however, the invention extends and includes any PSK such as MSK, QPSK, etc. Assuming a bi-phase shift keyed signal, phase reversals would occur at each one/zero transition of the PN code. This is usually accomplished in one of two ways. The first is through a programmable correlator which can output all phases in each element. As illustratively shown in FIG. 6, for a bi-phase shift keyed device a count controller 101 controls a code clock generator 102 which sends L clock signals to a code generator 104 and reference registers 105. Code generator 104 then produces a unique code as determined by code selector 103 and loads it into reference registers 105. Once the code is stored in reference registers 105, the zero/one pattern is loaded into delay line correlator 106, with the contents of register A(2) connected to element T(2), and so on to element A(L). The correlator is then programmed so that all the outputs of the elements corresponding to a first data symbol are connected to summing devices 108, 110 and all outfits of the elements corresponding to a second data symbol are connected to summing devices 109, 111. In this example, the first data symbol is embodied as a first phase symbol, and the second data symbol is embodied as a second phase symbol.

In non-preferable devices, these phase shifts are programmed at the time of construction through transducers placed in each element to produce an elemental phase match and cannot be changed by the user, thus only one code sentence can be correlated. Inverted and non-inverted phase elements are then summed together just as in the programmable device.

When a signal with a PN code, PSK modulation, and RF frequency equivalent to that in the SAW correlator is received, thence received signal is amplified (and maybe down-converted, although down conversion to an IF frequency is not preferred unless necessary) and fed to delay line correlator 106. As the wave propagates across the surface of the correlator, the energy in each delay element increases by a factor determined by the phase of the reference elements versus the received signal phase.

The output of the delay elements which are in phase with the first phase are summed in summers 108, 110, while those elements which are 180° out of phase with the first phase are summed in summers 109, 111. When a non-inverted code segment, PSK modulated signal with the same PN code phase shifts as those referenced in the correlator propagates through the device and the first code chip reaches the end of the delay line, all the phase shifts of the received signal match those of the elements comprising the correlator, and a first phase maximum energy is obtained. The output of inverted first phase summer 109 is inverted by phase inverter 112 and summed in phase with the output of first phase summer 108 in summer 114. If the output of summer 114 exceeds the threshold set in threshold detector 116 by threshold setter 118, a first data symbol correlation signal is generated by threshold detector 116 and fed to data generator 119, which produces a first data symbol signal.

When an inverted code segment, PSK modulated signal with the same non-inverted PN code phase shifts as those referenced in the correlator propagates through the device and the first code chip reaches the end of the delay line, all the phase shifts of the received signal match those of the elements comprising the correlator, and an inverted first phase maximum energy is obtained. The output of the first phase summer 110 is inverted by phase inverter 113 and summed in phase with the output of inverted first phase summer 111 in summer 115. If the output of summer 115 exceeds the threshold set in threshold detector 117 by threshold setter 118, a second data symbol correlation signal is generated by threshold detector 117 and fed to data generator 119, which produces a second data symbol signal.

A difference between the method and apparatus of this invention and those used in the prior art is that the correlation pulse is used to directly derive the data symbols, while other systems may use the pulse for synchronizing a much longer reference code signal to the incoming received code signal.

A difference between SAW devices and digital correlators is in the frequency bands in which they are used. The SAW devices are usually employed at IF, but they can be used at RF. The digital correlators are usually used at baseband. Another difference is that SAW devices perform phase shift comparisons while the digital correlators perform voltage level comparisons. Further, the SAW devices sum the outputs differently from that of digital correlators. Also, when the present invention is realized with a SAW correlator, no receive code clock is required to correlate the PN code. The present invention, using a SAW correlator, may be realized using fewer components.

The present invention further includes methods using a correlator for decoding a received PSK spread spectrum signal, which includes a data signal modulated with a PN code, and modulated with an RF carrier to produce a spread spectrum RF signal. The first method comprises of steps, using the digital correlator, of setting upper- and lower-threshold levels using a threshold setting means, storing a pseudo-noise signal in a reference-sequence-storage means, storing the received spread spectrum signal in receive-sequence-storage means, correlating the received spread spectrum signal with the pseudo-noise signal to generate a correlation signal, comparing the correlation signal to an upper-threshold level and a lower-threshold level, and generating a first data symbol in response to the correlation signal being greater than the upper-threshold level, and generating a second data symbol in response to the correlation signal being less than the lower-threshold level.

The second method comprises, using an analog correlator as exemplified by a SAW correlator, of setting two threshold levels, which may be equivalent, using a threshold setting means, storing a pseudo-noise signal in a reference-sequence-storage means, storing the received spread spectrum signal in receive-sequence-storage means, correlating the received spread spectrum signal with the pseudo-noise signal to generate two correlation signals, comparing the first correlation signal to a first threshold level and comparing an inverse correlation signal to a second threshold level, and generating a first data symbol in response to the first correlation signal being greater than the first threshold level, and generating a second data symbol in response to the inverse correlation signal being greater than the second threshold level.

It will be apparent to those skilled in the art that various modifications can be made to the apparatus for decoding a received spread spectrum signal, which includes a data signal modulated with spread spectrum, of the instant invention without departing from the scope or spirit of the invention, and it is intended that the present invention cover modifications and variations of the apparatus provided they come within the scope of the appended claims and their equivalents.

We claim:

1. Apparatus for decoding a spread spectrum signal, said spread spectrum signal having a data signal modulated with the entirety of a pseudo-noise code, said apparatus comprising a plurality of receiving registers capable of storing a received spread spectrum signal comprising a first plurality of chips, a plurality of reference registers capable of storing an entire pseudo-noise code comprising a second plurality of chips, a plurality of adders, each of said adders connected to one of said plurality of receiving registers and one of said plurality of reference registers, each of said adders having an output connected to a summer, said summer outputting a correlation signal, and a data generator responsive to said correlation signal, generating, at selected clock times, a first data symbol in response to a comparison of said correlation signal and a first predetermined threshold level, and a second data symbol at said clock times in response to a comparison of said correlation signal and a second predetermined threshold level.

2. Apparatus for decoding a spread spectrum signal, said spread spectrum signal having a data signal modulated with the entirety of a code, said apparatus comprising a plurality of receiving registers capable of storing a received spread spectrum signal comprising a first plurality of chips, a plurality of reference registers capable of storing an entire pseudo-noise code comprising a second plurality of chips, a plurality of adders, each of said adders connected to one of said plurality of receiving registers and one of said plurality of reference registers, each of said adders having an adder output, a summer having inputs connected to said adder outputs, said summer outputting a correlation signal, and a data generator responsive to said correlation signal, whereby a first data symbol is generated in response to a comparison of said correlation signal with a first threshold level, and a second data symbol is generated in response to a comparison of said correlation signal with a second threshold level.

3. Apparatus for decoding a spread spectrum signal, said spread spectrum signal having a data signal modulated with the entirety of a code of length L, said apparatus comprising means for generating a correlation signal for $L/2+1$ or more chips of said spread spectrum signal and $L/2+1$ or more chips of a signal corresponding to said code; and means for directly generating a plurality of data symbols in response to a comparison of said correlation signal with a plurality of threshold levels.

4. Apparatus for decoding a spread spectrum signal, said spread spectrum signal having a data signal modulated with a code of length L, said apparatus comprising means for generating a correlation signal for said spread spectrum signal and a signal corresponding to said code; and means for directly generating a data signal in response to said correlation signal, said data signal comprising one data bit for each L chips in said code.

5. Apparatus for decoding a spread spectrum signal, said spread spectrum signal having a data signal modulated with a code, said apparatus comprising means for generating a correlation signal for said spread spectrum signal and a signal corresponding to said code; and means for generating a data signal in response to said correlation signal, without reference to a code preamble for said code.

6. Apparatus for decoding a spread spectrum signal, said spread spectrum signal having a data signal modulated with a code, said apparatus comprising means for generating a correlation signal for said spread spectrum signal and a signal corresponding to said code; and means for generating a data signal in response to said correlation signal without reference to a synchronization signal for said code.

7. Apparatus for decoding a spread spectrum signal, said spread spectrum signal having a data signal modulated with a code, said apparatus comprising means for generating a correlation signal for said spread spectrum signal and a signal corresponding to said code; and means for generating a data signal in response to said correlation signal, without reference to either a synchronization signal or a code preamble for said code.

8. A method of decoding a spread spectrum signal, said spread spectrum signal having a data signal modulated with the entirety of a pseudo-noise code having a length of L chips, said method comprising the steps of:

receiving and storing said spread spectrum signal, generating and storing a reference signal corresponding to at least $L/2+1$ chips of said pseudo-noise code, comparing each chip of said spread spectrum signal with a corresponding chip of said reference signal, generating a correlation signal representing a degree of match between said spread spectrum signal and said reference signal, and generating, at selected clock times, a first data symbol in response to a comparison of said correlation signal and a first predetermined threshold level, and a second data symbol at said clock times in response to a comparison of said correlation signal and a second predetermined threshold level.

9. A method of decoding a spread spectrum signal, said spread spectrum signal having a data signal modulated with the entirety of a code having a length of L chips, said method comprising the steps of receiving and storing said spread spectrum signal, generating a reference signal corresponding to at least L/2+1 chips of said pseudo-noise code, adding each chip of said spread spectrum signal with a corresponding chip of said reference signal, and generating a plurality of chip comparison signals thereby, generating a correlation signal by adding an output of each of said chip comparison signals, and generating a first data symbol in response to a comparison of said correlation signal with a first threshold level, and a second data symbol in response to a comparison of said correlation signal with a second threshold level.

10. A method of decoding a spread spectrum signal, said spread spectrum signal having a data signal modulated with the entirety of a code of length L, comprising the steps of comparing L/2+1 or more chips of said spread spectrum signal with L/2+1 or more chips of a signal corresponding to said code, and generating a correlation signal thereby, directly generating a plurality of data symbols in response to a comparison of said correlation signal with a plurality of threshold levels.

11. A method for decoding a spread spectrum signal, said spread spectrum signal having a data signal modulated with a code of length L, said method comprising the steps of generating a correlation signal for said spread spectrum signal and a signal corresponding to said code, and directly generating a data signal in response to said correlation signal, said data signal comprising one data bit for each L chips in said code.

12. A method of decoding a spread spectrum signal, said spread spectrum signal having a data signal modulated with a code of length L, said method comprising the steps of generating a correlation signal for said spread spectrum signal and a signal corresponding to said code; and generating a data signal in response to said correlation signal, without reference to a code preamble for said code.

13. A method of decoding a spread spectrum signal, said spread spectrum signal having a data signal modulated with the entirety of a code, comprising the steps of generating a correlation signal for said spread spectrum signal and a signal corresponding to said code, and generating a data signal in response to said correlation signal, without reference to a synchronization signal for said code.

14. A method of decoding a spread spectrum signal, said spread spectrum signal having a data signal modulated with a code, said method comprising the steps of generating a correlation signal for said spread spectrum signal and a signal corresponding to said code, and generating a data signal in response to said correlation signal, without reference to either a synchronization signal or a code preamble for said code.

15. Apparatus for decoding a spread spectrum signal, said spread spectrum signal having a data signal modulated with the entirety of a pseudo-noise code, said apparatus comprising a receiving register comprising a first plurality of stages wherein a first plurality of chips from an incoming signal are received and stored, a reference register comprising a second plurality of stages wherein a second plurality of chips corresponding to a pseudo-noise code are stored, a plurality of adders, each of said adders connected to one of said first plurality of stages and a corresponding one of said second plurality of stages, a summer connected to an output of each of said adders, a threshold setting circuit having as outputs a first threshold signal and a second threshold signal, a first comparator having a first input connected to said summer and a second input to said first threshold signal, and outputting a first comparison signal, a second comparator having a first input connected to said summer and a second input to said second threshold signal, and outputting a second comparison signal, and a data generator responsive to said first and second comparison signals, outputting a first data symbol in response to said first comparison signal, and a second data symbol in response to said second comparison signal.

16. The apparatus of claim 15 further comprising a code generator capable of generating a plurality of pseudo-noise codes, from which one of said plurality of pseudo-noise codes is selected for storing in said reference register.

17. The apparatus of claim 16 further comprising a code selector connected to said code generator, whereby one of said plurality of pseudo-noise codes is selected for storing in said reference register.

18. The apparatus of claim 15 further comprising a counter coupled to a code clock generator, whereby said code clock generator controls loading of said pseudo-noise code into said reference register.

19. The apparatus of claim 3 wherein said correlation signal is generated for fewer than L but more than L/2+1 chips of said spread spectrum signal.

20. The method of claim 10 wherein said correlation signal is generated for a comparison of fewer than L but more than L/2+1 chips of said spread spectrum signal and said signal corresponding to said code.

* * * * *